United States Patent
Dost et al.

(10) Patent No.: US 10,305,734 B2
(45) Date of Patent: May 28, 2019

(54) METHOD, SYSTEM, AND PROGRAM STORAGE DEVICE FOR CUSTOMIZATION OF SERVICES IN AN INDUSTRIAL INTERNET OF THINGS

(71) Applicant: General Electric Company, Schenectady, NY (US)

(72) Inventors: Richard Dost, Alameda, CA (US); Eric Steele, San Ramon, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 430 days.

(21) Appl. No.: 15/093,502

(22) Filed: Apr. 7, 2016

(65) Prior Publication Data

US 2017/0295057 A1    Oct. 12, 2017

(51) Int. Cl.
*H04L 12/24* (2006.01)
*H04L 29/08* (2006.01)
*H04W 4/70* (2018.01)

(52) U.S. Cl.
CPC ............ *H04L 41/082* (2013.01); *H04L 67/12* (2013.01); *H04L 67/125* (2013.01); *H04W 4/70* (2018.02)

(58) Field of Classification Search
CPC ...... H04L 41/082; H04L 67/12; H04L 67/125
USPC ....................... 709/217, 220, 221
See application file for complete search history.

(56) References Cited

U.S. PATENT DOCUMENTS

| | | | |
|---|---|---|---|
| 6,275,868 B1 | 8/2001 | Fraley et al. | |
| 8,490,052 B2 | 7/2013 | Shukla et al. | |
| 8,689,181 B2 | 4/2014 | Biron, III | |
| 9,201,633 B2 | 12/2015 | Kalapati et al. | |
| 9,218,269 B2 | 12/2015 | Dolinina et al. | |
| 9,231,819 B2 | 1/2016 | Pasternak | |

(Continued)

OTHER PUBLICATIONS

Chung, Sam, et al., "Modeling Web Applications Using Java and XML Related Technologies", *Proceedings of the 36th Hawaii International Conference on System Sciences (HICSS'03)*, (Jan. 6-9, 2003), 10 pgs.

(Continued)

*Primary Examiner* — Joseph E Avellino
*Assistant Examiner* — Marshall M McLeod
(74) *Attorney, Agent, or Firm* — Buckley, Maschoff & Talwalkar LLC

(57) ABSTRACT

A system includes at least one hardware processor and a memory storing a plurality of service configurations and a plurality of configuration programs, including a first configuration program, and a first service configuration identifying at least one conditional element and the first configuration program. The system also includes a customization engine configured to receive a REST call from a requesting device, the REST call identifying an IIoT machine, the IIoT machine executing a service exposing a REST-ful API. The customization engine also parses the REST call into a plurality of parameters, compares the parameters to the conditional element(s) and determines that the parameters satisfies the conditional element(s), identifies the first configuration program from the first service configuration, and executes the first configuration program resulting in a second plurality of parameters, constructs an outbound REST call to include the second parameters, and transmits the outbound REST call to the IIoT machine.

20 Claims, 8 Drawing Sheets

(56) References Cited

U.S. PATENT DOCUMENTS

2015/0271271 A1* 9/2015 Bullotta ................ H04L 67/141
                                                              709/228
2016/0105371 A1* 4/2016 Choi ....................... H04L 47/70
                                                              370/230
2016/0277530 A1* 9/2016 Jung ....................... H04W 4/70

OTHER PUBLICATIONS

Johnson, Andrew, et al., "The SANDBOX: a virtual reality interface to scientific databases", Proceedings., *Seventh International Working Conference on Scientific and Statistical Database Management 1994*. (Sep. 28-30, 1994), 12-21.

Kovatsch, Matthias, et al., "Actinium: A RESTful Runtime Container for Scriptable Internet of Things Applications", *3rd International Conference on the Internet of Things (IOT), 2012*, (Oct. 24-26, 2012), 135-142.

\* cited by examiner

METHOD, SYSTEM, AND PROGRAM STORAGE DEVICE FOR CUSTOMIZATION OF SERVICES IN AN INDUSTRIAL INTERNET OF THINGS

TECHNICAL FIELD

This application relates generally to software services. More particularly, this application relates to customization of software services for fleet assets in an Industrial Internet of Things.

BACKGROUND

The traditional Internet of Things (IoT) involves the connection of various consumer devices, such as coffee pots and alarm clocks, to the Internet to allow for various levels of control and automation of those devices. The Industrial Internet of Things (IIoT), on the other hand, involves connecting industrial assets as opposed to consumer devices. There are technical challenges involved in interconnecting diverse industrial assets, such as wind turbines, jet engines, and locomotives, which simply do not exist in the realm of consumer devices.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
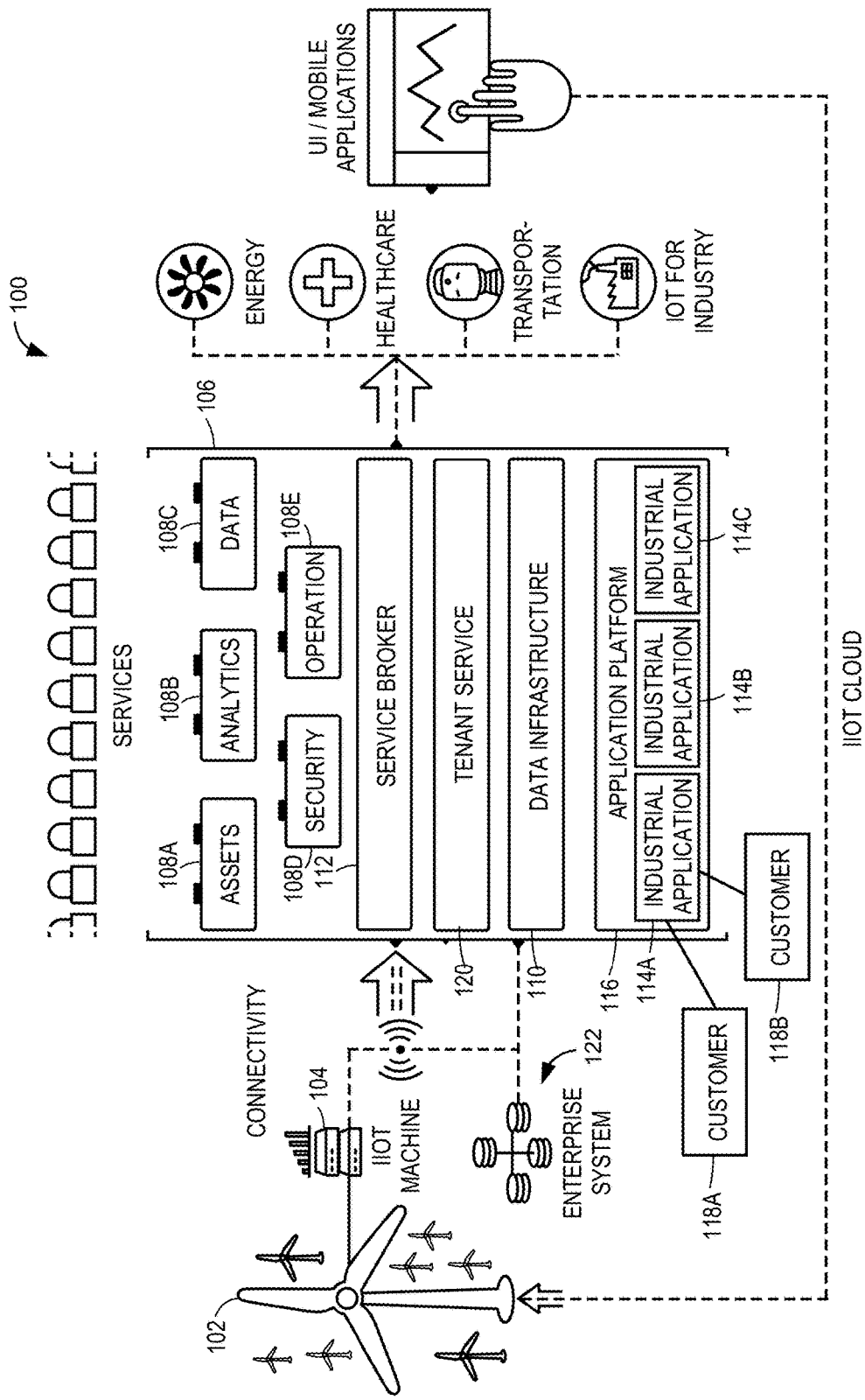
FIG. 1 is a block diagram illustrating a system, in accordance with an example embodiment, implementing an IIoT.

The description that follows includes illustrative systems, methods, techniques, instruction sequences, and machine-readable media (e.g., computing machine program products) that embody illustrative embodiments. In the following description, for purposes of explanation, numerous specific details are set forth in order to provide an understanding of various embodiments of the inventive subject matter. It will be evident, however, to those skilled in the art that embodiments of the disclosed subject matter may be practiced without these specific details. In general, well-known instruction instances, protocols, structures, and techniques have not been shown in detail.

Some of the technical challenges involved in an IIoT include customizing aspects of services exposed by fleet assets across a large fleet of industrial assets. Fleet assets in the IIoT may expose a service (e.g., via an application programming interface (API)) to an IIoT cloud, thereby enabling the IIoT cloud to perform network-based asset management functions on the asset through the cloud. The service may provide an "integrated API" (e.g., a REST-ful API (representational state transfer)) that enables remote systems (e.g., asset management servers in the cloud) to submit operations to the asset, such as, for example, query operations for asset data, or state change operations to be performed on the asset. However, asset managers may wish to customize (e.g., tailor) operations performed on the assets in various respects, or specific to particular devices or operations, or additional functionality above and beyond what is capable via the integrated API, and without detailed software changes on the particular assets. Further, in the example embodiments, the IIoT cloud provides "digital twins" of the fleet assets (e.g., a "physical twin" of a pair being the physical asset, and a "digital twin" being a digital model of the physical asset). The digital twin receives sensor data from the physical twin and uses the sensor data for various purposes, such as modeling of the physical asset. The service and API described herein may be provided for the digital twin, allowing asset managers to perform analytics and other forms of analysis and processing.

In an example embodiment, the IIoT cloud provides a customization engine that enables asset managers to customize incoming operations for endpoints (e.g., fleet assets in the IIoT). The customization engine is deployed in the IIoT cloud and receives REST requests (or "REST calls") from a requesting device. The customization engine performs pre-processing on the original request (e.g., before the asset API receives and processes the request) based on service configurations provided by the asset manager.

More specifically, in an example embodiment, the asset manager creates a "service configuration" within the customization engine, along with a configuration program (e.g., instructions that effect some change). The service configuration and configuration program are used by the customization engine to pre-process the inbound API request prior to the API request reaching the endpoint. The service configuration defines the conditions upon which the customization engine 310 will execute the configuration program, and the configuration program defines the steps (e.g., operations) to be executed to effect the desired change. For example, the asset manager may wish to block "update" type API requests to a particular asset. Thus, the asset manager may define a service configuration identifying the particular asset and "update" type operations, and may define the service configuration to execute a configuration program (e.g., a script) that, when executed, causes the API request to be rejected. When an API request is received, the customization engine detects that the service configuration conditions are met (e.g., the API request identifies the particular asset, and is an "update" type operation), and executes the configuration program. Execution of the configuration program, in this example, causes the customization engine 310 to reject the API request, thereby responding to the API request before the API request reaches the asset. In other scenarios, the configuration program may be configured to perform other pre-processing operations such as validating or modifying incoming data, or preventing certain operations (e.g., that may otherwise be provided by the API), or other functionality not native to the integrated API, and subsequently passing the API operation on to the asset (e.g., for final processing by the asset).

Accordingly, the customization engine enables the user to extend the base functionality provided by the integrated API without having to modify the API itself (e.g., without re-programming the integrated API). The customization engine enables asset managers to initiate customized programs (e.g., the configuration programs), for example, to operate on API operations for different assets, sets of assets, asset types, asset families, types of API operations, conditions of incoming data, or other conditional criteria (e.g., via the service configurations). The customized programs enable asset managers to configure particular actions or operations on API requests when the service configuration conditions are met, giving flexibility to add additional functionality not necessarily provided by the integrated API. In some known systems, user-customized operations may force the API into a non-RESTful state, losing the value of REST. Here, adoption of a RESTful architecture facilitates ease of use, and fosters scalability and industry acceptance. The customization engine remains RESTful while the customization is handled by the customization programs, as defined and initiated by the service configurations.

FIG. 1 is a block diagram illustrating a system 100, in accordance with an example embodiment, implementing an IIoT. An industrial asset 102, such as a wind turbine as depicted here, may be directly connected to an IIoT machine 104. The IIoT machine 104 is a software stack that can be embedded into hardware devices such as industrial control systems or network gateways. The software stack may include its own software development kit (SDK). The SDK includes functions that enable developers to leverage the core features described below.

One responsibility of the IIoT machine 104 is to provide secure, bi-directional cloud connectivity to, and management of, industrial assets 102, while also enabling applications (analytical and operational services) at the edge of the IIoT. The latter permits the delivery of near-real-time processing in controlled environments. Thus, the IIoT machine 104 connects to an IIoT cloud 106, which includes various modules, including asset module 108A, analytics module 108B, data module 108C, security module 108D, and operations module 108E, as well as data infrastructure 110. This allows other computing devices, such as client computers, running user interfaces/mobile applications to perform various analyses of either the individual industrial asset 102 or assets of the same type.

The IIoT machine 104 also provides security, authentication, and governance services for endpoint devices. This allows security profiles to be audited and managed centrally across devices, ensuring that assets are connected, controlled, and managed in a safe and secure manner, and that critical data is protected.

Figure 2:
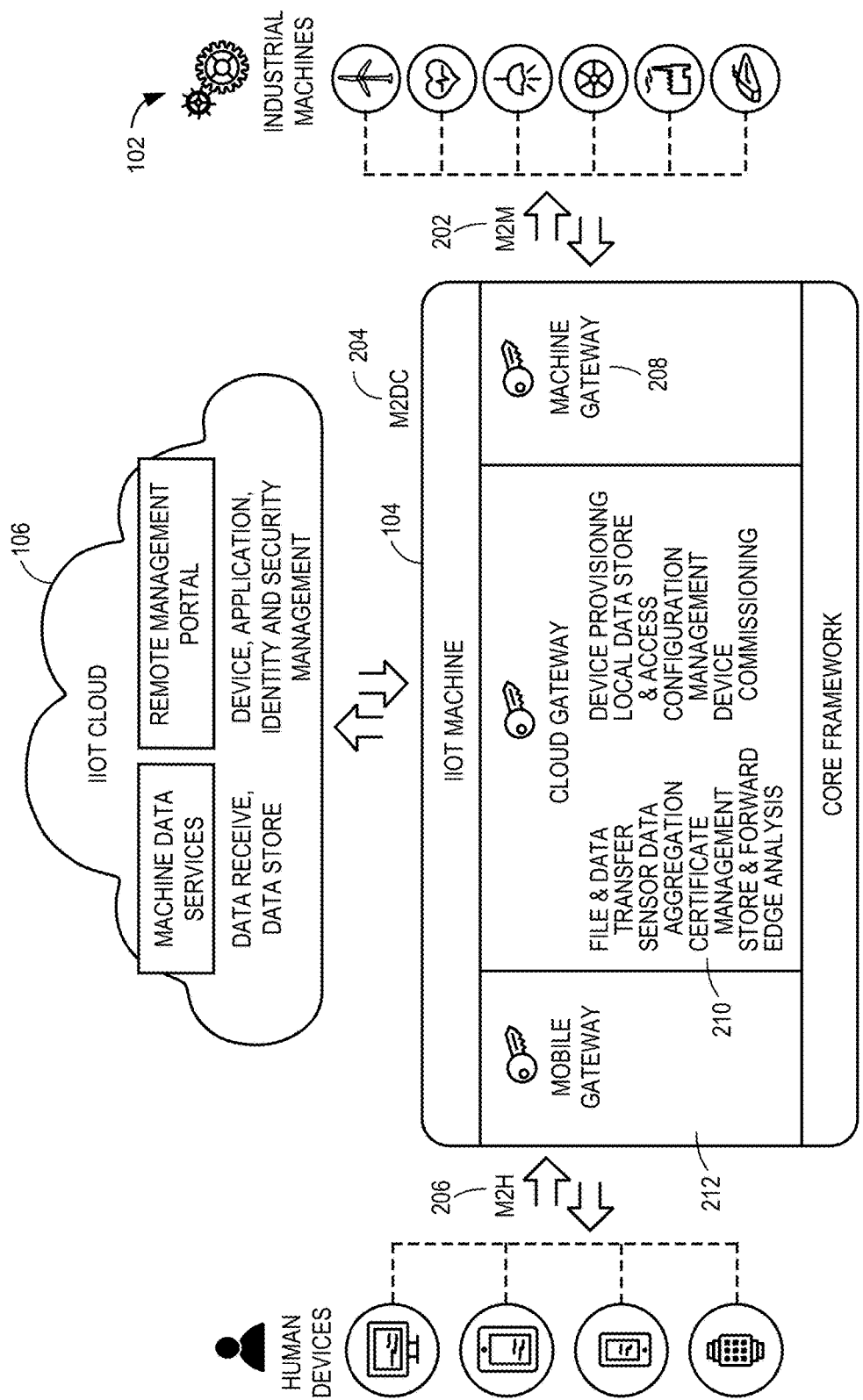
FIG. 2 is a block diagram illustrating different edge connectivity options that an IIoT machine provides, in accordance with an example embodiment.

In order to meet requirements for industrial connectivity, the IIoT machine 104 can support gateway solutions that connect multiple edge components via various industry standard protocols. FIG. 2 is a block diagram illustrating different edge connectivity options that an IIoT machine 104 provides, in accordance with an example embodiment. There are generally three types of edge connectivity options that an IIoT machine 104 provides: machine gateway (M2M) 202, cloud gateway (M2DC) 204, and mobile gateway (M2H) 206.

Many assets may already support connectivity through industrial protocols such as Open Platform Communication Unified Architecture (OPC-UA) or ModBus. A machine gateway component 208 may provide an extensible plug-in framework that enables connectivity to assets via M2M 202 based on these common industrial protocols.

A cloud gateway component 210 connects an IIoT machine 104 to an IIoT cloud 106 via M2DC 204, and to an enterprise system 122.

A mobile gateway component 212 enables people to bypass the IIoT cloud 106 and establish a direct connection to an asset 102. This may be especially important for maintenance scenarios. When service technicians are deployed to maintain or repair machines, they can connect directly from their machine to understand the asset's operating conditions and perform troubleshooting. In certain industrial environments, where connectivity can be challenging, the ability to bypass the cloud and create this direct connection to the asset may be significant.

As described briefly above, there are a series of core capabilities provided by the IIoT system 100. Industrial scale data, which can be massive and is often generated continuously, cannot always be efficiently transferred to the cloud for processing, unlike data from consumer devices. Edge analytics provide a way to preprocess the data so that only the pertinent information is sent to the cloud. Various core capabilities provided include file and data transfer, store and forward, local data store and access, sensor data aggregation, edge analytics, certificate management, device provisioning, device decommissioning, and configuration management.

As described briefly above, the IIoT machine 104 can be deployed in various different ways. These include on the gateway, on controllers, or on sensor nodes. The gateway acts as a smart conduit between the IIoT cloud 106 and the asset(s) 102. The IIoT machine 104 may be deployed on the gateway device to provide connectivity to asset(s) 102 via a variety of protocols.

The IIoT machine 104 can be deployed directly onto machine controller units. This decouples the machine software from the machine hardware, allowing connectivity, upgradability, cross-compatibility, remote access, and remote control. It also enables industrial and commercial assets that have traditionally operated standalone or in very isolated networks to be connected directly to the IIoT cloud 106 for data collection and live analytics.

The IIoT machine 104 can be deployed on sensor nodes. In this scenario, the intelligence lives in the IIoT cloud 106 and simple, low-cost sensors can be deployed on or near the asset(s) 102. The sensors collect machine and environmental data and then backhaul this data to the IIoT cloud 106 (directly or through an IIoT gateway), where it is stored, analyzed, and visualized.

Customers or other users may create applications to operate in the IIoT cloud 106. While the applications reside in the IIoT cloud 106, they may rely partially on the local IIoT machines 104 to provide the capabilities to gather sensor data, process it locally, and then push it to the IIoT cloud 106.

The IIoT cloud 106 enables the IIoT by providing a scalable cloud infrastructure that serves as a basis for platform-as-a-service (PaaS), which is what developers use to create Industrial Internet applications for use in the IIoT cloud.

Referring back to FIG. 1, services provided by the IIoT cloud and generally available to applications designed by developers include asset services from asset module 108A, analytics services from analytics module 108B, data services from data module 108C, application security services from security module 108D, and operational services from operations module 108E.

Asset services include services to create, import, and organize asset models and their associated business rules. Data services include services to ingest, clean, merge, and ultimately store data in the appropriate storage technology so that it can be made available to applications in the manner most suitable to their use case.

Analytics services include services to create, catalog, and orchestrate analytics that will serve as the basis for applications to create insights about industrial assets. Application security services include services to meet end-to-end security requirements, including those related to authentication and authorization.

Operational services enable application developers to manage the lifecycle and commercialization of their applications. Operational services may include development operational services, which are services to develop and deploy Industrial Internet applications in the cloud, as well as business operational services, which are services that enable transparency into the usage of Industrial Internet applications so that developers can ensure profitability.

The asset model may be the centerpiece of many, if not all, Industrial Internet applications. While assets are the instantiations of asset types (types of industrial equipment, such as turbines), the asset model is a digital representation of the asset's structure. In an example embodiment, the asset service provides APIs, such as REST-ful APIs, which enable application developers to create and store asset models that define asset properties, as well as relationships between assets and other modeling elements. Application developers can then leverage the service to store asset-instance data. For example, an application developer can create an asset model that describes the logical component structure of all turbines in a wind farm and then create instances of that model to represent each individual turbine. Developers can also create custom modeling objects to meet their own unique domain needs.

In an example embodiment, the asset module 108A may include an API layer, a query engine, and a graph database. The API layer acts to translate data for storage and query in the graph database. The query engine enables developers to use a standardized language, such as Graph Expression Language (GEL), to retrieve data about any object or property of any object in the asset service data store. The graph database stores the data.

An asset model represents the information that application developers store about assets, how assets are organized, and how they are related. Application developers can use the asset module 108A APIs to define a consistent asset model and a hierarchical structure for the data. Each piece of physical equipment may then be represented by an asset instance. Assets can be organized by classification and by any number of custom modeling objects. For example, an organization can use a location object to store data about where its pumps are manufactured, and then use a manufacturer object to store data about specific pump suppliers. It can also use several classifications of pumps to define pump types, assign multiple attributes, such as Brass or Steel, to each classification, and associate multiple meters, such as Flow or Pressure, to a classification.

Data services from the data module 108C enable Industrial Internet application developers to bring data into the system and make it available for their applications. This data may be ingested via an ingestion pipeline that allows for the data to be cleansed, merged with data from other data sources, and stored in the appropriate type of data store, whether it be a time series data store for sensor data, a Binary Large Object (BLOB) store for medical images, or a relational database management system (RDBMS).

Since many of the assets are industrial in nature, much of the data that will commonly be brought into the IIoT system 100 for analysis is sensor data from industrial assets. In an example embodiment, a time series service may provide a query efficient columnar storage format optimized for time series data. As the continuous stream of information flows from sensors and needs to be analyzed based on the time aspect, the arrival time of each stream can be maintained and indexed in this storage format for faster queries. The time series service also may provide the ability to efficiently ingest massive amounts of data based on extensible data models. The time series service capabilities address operational challenges posed by the volume, velocity, and variety of IIoT data, such as efficient storage of time series data, indexing of data for quick retrieval, high availability, horizontal scalability, and data point precision.

The application security services provided by the security module 108D include user account and authentication (UAA) and access control. The UAA service provides a mechanism for applications to authenticate users by setting up a UAA zone. An application developer can bind the application to the UAA service and then use services such as basic login and logout support for the application, without needing to recode these services for each application. Access control may be provided as a policy-drive authorization service that enables applications to create access restrictions to resources based on a number of criteria.

Thus, a situation arises where application developers wishing to create industrial applications for use in the IIoT may wish to use common services that many such industrial applications may use, such as a log-in page, time series management, data storage, and the like. A developer can utilize such services is by instantiating instances of the services and then having their applications consume those instances. Typically, many services may be so instantiated.

Customers 118A, 118B may then interact with applications 114A-114C to which they have subscribed. Here, for illustrative purposes, customers 118A and 118B are both tenants of application 114A. A tenant service 120 may be used to manage tenant-related modifications, such as management of templates and creation of tenants.

Figure 3:
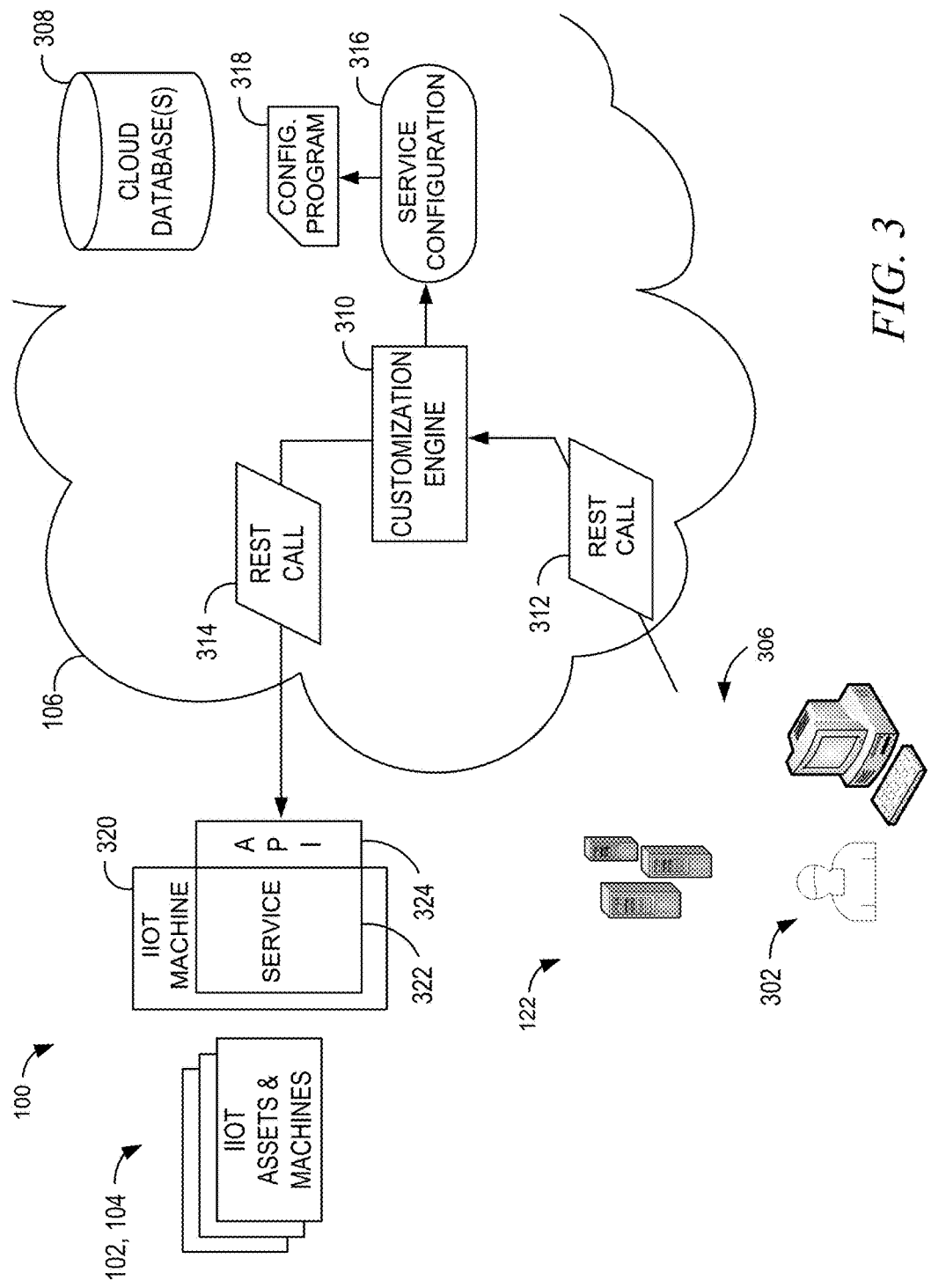
FIG. 3 is a block diagram illustrating a customization engine, in accordance with an example embodiment, providing cloud-based customization functionality for an IIoT machine in the IIoT system.

FIG. 3 is a block diagram illustrating a customization engine 310, in accordance with an example embodiment, providing cloud-based customization functionality for an IIoT machine 320 in the IIoT system 100. The IIoT machine 320, sometimes referred to herein as an "endpoint," may be similar to the IIoT assets 102 or IIoT machines 104, and the customization engine 310 may be similar to operation module 108E. In the example embodiment, the IIoT machine 320 hosts a service 322 associated with one or more industrial assets 102. The service 322 may be, for example, any of the services described above with reference to the industrial assets 102 and IIoT machines 104. The service 322 exposes a programmatic interface (e.g., API 324) that enables requesting devices 306 to communicate with (e.g., submit requests to perform operations using, submit requests for data through) the service 322. A user 302 (e.g., an asset administrator or a developer) may, for example, desire the service 322 of the IIoT machine 320 to provide functionality not natively supported by the service 322, and may not desire to, or be able to, alter the service 322 directly. Accordingly, the customization engine 310 operates on communications (e.g., API calls) between the requesting device 306 and the API 324 to provide the customized functionality.

In this example, the API 324 is a REST-ful API. In other words, the API 324 is configured to support communications with external devices (e.g., the customization engine 310) in conformance with REST communications architecture. The customization engine 310 may communicate with the API 324 using Hypertext Transfer Protocol (HTTP), with a Uniform Resource Locator (URL), HTTP verbs (e.g., GET, POST, PUT, and so forth), identifying resources on the IIoT machine 320 using Uniform Resource Identifiers (URIs), and with stateless communication between requests. The example REST call 312 includes the HTTP verb (e.g., GET, POST, PUT, DELETE, and so forth), as well as a message body. The message body includes the URI and, optionally, one or more parameters (e.g., as a JavaScript Object Notation (JSON)-formatted hash of attributes). The various components of the REST call 312 may be inspected by the customization engine 310, as described below.

During a setup phase, the user 302 (e.g., the asset administrator or the developer) configures the customization engine 310 to add new functionality to incoming operational calls (e.g., for REST calls 312 bound for endpoints such as the IIoT machine 320). For example, the user 302 may configure the customization engine 310 to:
  validate data in the REST call 312 (e.g., check for the presence or absence of particular fields, check for particular values or value ranges of particular fields, syntax check for conformance with a JSON schema, and so forth);
  add, edit, or delete data in the REST call 312 (e.g., add a timestamp, add a field, edit or remove fields, and so forth);
  validate operations (e.g., prevent particular operations, prevent operations to particular machines or assets, prevent particular operations to particular machines or assets, prevent operations based on pre-determined or dynamic conditions, and so forth);
  conditionally perform operations (e.g., perform operations when detecting a particular REST verb, or when detecting a particular data management operation (e.g., create, read, update, delete (CRUD)), or on a particular asset or a particular family of assets in an asset hierarchy, and so forth); and
  perform additional operations (e.g., generate an email, create a log entry, send REST requests, send SMS text messages, and so forth),
or any combination thereof.

To facilitate these customizations, the customization engine 310 provides the user 302 (e.g., an asset manager, a developer) with the ability to create service configurations 316 and configuration programs 318. The service configurations 316 include configuration elements, some of which may be conditions (e.g., conditional elements) upon which the customization engine 310 is going to take additional actions (e.g., upon receiving the REST call 312). The configuration programs 318 represent the additional actions to be taken (e.g., the operations which effect change, such as the functionality examples provided above). For example, presume the user 302 desires to disable all REST calls to the IIoT machine 320. As such, the user 302 may create the service configuration 316 to activate if the REST call 312 is bound for the particular IIoT machine 320, and may create the configuration program 318 to reject the REST call 312. Accordingly, when the REST call 312 bound for the IIoT machine 320 is received by the customization engine 310, the customization engine 310 applies the service configuration 316 to the REST call (e.g., comparing the conditional elements in the service configuration 316 to the parameters of the REST call). Because this example REST call 312 satisfies the conditions provided by this example service configuration 316, the customization engine 310 executes the configuration program 318, thereby causing the REST call to be rejected.

For example, presume the asset manager configures the service configuration 316 to prevent "delete" type operations to the IIoT machine 320. Accordingly, the asset manager may create the service configuration 316 with the following syntax:

```
{
    uri: "/svcconf/assets-need-assetId",
    onReferenceTo: "assets",
    methods: "DELETE",
    confprg: "/confprg/fail-if-no-assetId"
}
```

The above is merely one example format for the service configurations 316. However, it should be understood that any configuration format that enables the systems and methods described herein may be used (e.g., Extensible Markup Language (XML), JSON).

In this example for the service configuration 316, the "uri" field identifies the URI of a service endpoint. Every domain object (e.g., service endpoint) in the asset database has a URI. As used here, the "uri" field identifies the service endpoint that causes the configuration program 318 to be executed. Further, in some embodiments, an asset manager (e.g., the user 302) may read, update, or delete the service configuration 316 (e.g., sending a PUT request to the URI of the service configuration 316).

The "onReferenceTo" field may be used to identify specific assets or domain objects (e.g., "/asset/555"), and may also include GEL query expressions which define sets of assets or domain objects (e.g., that would trigger the action if the referenced asset is in the set, such as "color=red" if the referenced asset's color is red). In some embodiments, the "onReferenceTo" may reference a REST collection (e.g., "assets"), or a user-defined endpoint (e.g., "/custom/generate-report"). In this example, the "onReferenceTo" field of "assets" causes the configuration program 318 to be executed when the REST call 312 is to "<ip:port>/assets".

In some embodiments, the "onReferenceTo" field may be used for custom endpoints that, for example, may implement various business logic. There is value in the system 100 being RESTful, but some non-RESTful business logic may be needed. Custom endpoints provide a method for implementing non-RESTful business logic. For another example, the "onReferenceTo" field may be set to "/custom/generate-report", and the customization engine may then send the REST call 312 to "<ip:port>/custom/generate-report". The customization engine 310 is configured to support custom endpoints as a method for users to trigger execution of the configuration program 318 (e.g., without having to CRUD an asset). The custom endpoints provide a method for ad-hoc code execution using the REST calls 312 coupled with the service configurations 316, and in a venue controllable and configurable by the user 302. In the example embodiment, only one service configuration 316 is provided per custom endpoint path. The asset manager initiates the REST call 312 to the custom endpoint (e.g., to "<ip:port>/custom/generate-report"), which causes the configuration program (e.g., as defined by the "confprg" field) to be executed. Further, the custom endpoints may set the body and status code of the response that is returned (e.g., in response to the REST call 312). The custom endpoints may be used, for example, to make multiple requests to the IIoT service 322 and return a report containing aggregated results. In another example, a custom endpoint may be used to check whether asset structures are conformant to an ideal. Some IIoT assets (e.g., jet engines) may be very complex structures, where each part of the asset has particular requirements. A custom endpoint may be used to check conformance on demand. Custom endpoints enable the base system 100 to remain RESTful while still providing an avenue for non-RESTful business logic to be implemented.

The "methods" field represents a conditional element for the service configuration 316 (e.g., if the REST call 312 identifies a "DELETE" method). The "methods" field may be used to identify the REST methods that cause the configuration program 318 to be executed. The "methods" field also accepts an array of values (e.g., "methods: ["GET", "DELETE"]").

The "confprg" field identifies the configuration program 318 to be executed if the condition(s) are satisfied (e.g., if the REST call 312 identifies a "DELETE" method, then execute the configuration program "/confprg/fail.js", a JavaScript file that rejects the REST call 312). The configuration programs 318 may be configured as small-functionality programs (e.g., which perform one task well). Dividing this functionality into small configuration programs 318 may allow different users to compose their own custom business logic without having to write scripts. In other words, a set of configuration programs 318 may be configured as an extensible business logic language. In some embodiments, multiple configuration programs 318 may be identified for execution (e.g., with an array of configuration programs, "confprg: ["/confprg/fail-if-no-assetId", "/confprg/text-message-alert"]").

Further, in some embodiments, the service configuration 316 may include a "disabled" field. The "disabled" field may be used to activate (e.g., "disabled: false") or deactivate (e.g., "disabled: true") the service configuration 316. The service configuration 316 may include a "priority" field. The "priority" field is a value (e.g., signed 32-bit integer, "priority: 100") that indicates the order in which service configurations 316 are executed (e.g., when multiple service configurations 316 match on the incoming REST call 312, the lowest "priority" value is executed first). Service configurations 316 having no "priority" field default to the executing latest (e.g., default of the maximum value of a signed 32-bit integer). Such priority may only be a consideration between multiple service configurations 316 if executed during the same stage (e.g., pre-processing, or post-processing). The service configuration 316 may include a "confprgParameters" field. The "confprgParameters" field may be used to inject data (e.g., parameters) into the execution of the configuration program 318 (e.g., environment variables). For example, the service configuration 316 may include:

```
scriptParamters: {
    arg1: "hello",
    arg2: 12345
}
```

As such, the above example element of the service configuration 316 causes a variable "arg1" to be injected, and having the value of "hello", as well as a variable "arg2", and having a value of 12345.

In the example embodiment, the "onReferenceTo", "methods", and "disabled" fields are examples of conditional elements (e.g., they are used to determine whether or not the inbound REST call 312 causes execution of the configuration program 318), and the "uri", "confprg", "confprgParameters", and "priority" fields are non-conditional elements (e.g., properties which perform some other function, such as identifying the configuration program 318, or identifying properties which are passed to the configuration program 318). In some embodiments, any of the configuration elements of the service configuration 316 may be used by the customization engine 310 as conditional elements. The non-conditional elements may facilitate sharing of configuration programs 318 between different users, where the non-conditional elements may enable customization of the configuration program 318 (e.g., tailoring the configuration program 318 as needed by the particular user, through the service configuration 316 rather than through changes to the configuration program 318). Some other syntax examples for conditional elements include, for example:

```
property: "assetId"    # if the property 'assetId' is present in assets
onReferenceTo: "/assets?filter=color=red", methods: ["PUT"]
```

In the example embodiment, the customization engine 310 supports multiple "active" service configurations 316. In other words, various asset managers may define many service configurations 316 across the broad fleet of assets 102, 104, each of which may be configured to execute different configuration programs 318 under different conditions. When the customization engine 310 has multiple service configurations 316 in effect (e.g., "active"), the customization engine 310 may apply incoming REST calls 312 to each of the service configurations 316, thereby potentially matching on multiple service configurations 316. The customization engine 310 may perform on each of the service configurations 316 that match on the incoming REST call 312. Further, the "priority" element of the service configuration 316 may be used to determine execution priority. Having multiple active service configurations 316 enables asset managers to keep service configurations 316 smaller and simpler than, for example, working with a single service configuration 316 for all service customizations that asset managers may want to implement across an entire fleet of assets 102, 104.

The customization engine 310 may also provide a pool (e.g., library) of configuration programs 318 (e.g., a suite of common operations) which asset managers may leverage. As such, different service configurations 316 may use the same configuration program, allowing reuse of configuration programs across different assets 102, 104. In some embodiments, the asset managers may also create custom configuration programs 318 and upload those configuration programs 318 to the cloud 106 for use by their service configurations 316. The configuration programs 318 may be, for example, scripts (e.g., Perl, JavaScript's), or executables (e.g., pre-compiled binaries, frameworks, libraries).

For example, an asset manager (e.g., the user 302) may configure a "watcher" configuration program 318 in which a network request may be initiated to notify someone if any asset in a defined pool of assets is modified. The pool of assets being watched, the person to be notified, and the method of notification may all be defined by the service configuration 316. As such, the asset manager (e.g., a non-programmer) may create the service configuration 316, pick, the notification method, person, and set of assets, and the watcher configuration program 318, all without having to perform any formal programming. The pool of assets may, for example, be defined by a database query, by asset id(s), or by other mechanism such as an "assignedTo" field.

During operation, the IIoT machine 320 is configured to operate with the customization engine 310 (e.g., for purposes of enabling the customization features as described herein). Initially, the requesting system 306 communicates with the IIoT machine 320 via a URL, provided by the cloud 106, which maps to the IIoT machine 320 (e.g., to the service 322 on the IIoT machine 320). In the example embodiment, to configure the IIoT machine 320 (e.g., the service 322 of the IIoT machine 320) for use under the customization engine 310, the URL is remapped (e.g., redirected) to the customization engine 310. Subsequently, the customization engine 310 then receives incoming requests (e.g., the REST call 312) and processes them as described herein (e.g., proxying REST calls 312, with additional functionality provided by the service configurations 316). In some embodiments, the IIoT service 322 may be further configured to only accept REST calls (e.g., outbound REST call 314) from the customization engine 310 (e.g., "whitelisting" just the customization engine 310, and perhaps select other trusted support devices).

More specifically, the requesting system 306 (e.g., a device from within the enterprise system 122) makes an operational call (e.g., the REST call 312) to the custom URL of the IIoT service 332. This URL maps to the customization engine 310, causing the REST call 312 to go to initially go to the customization engine 310. Upon receipt of the REST call 312, the customization engine 310 parses the REST call 312 into its parameters (e.g., URL, HTTP verb, URI, and so forth), and checks for any active service conditions 316 that match the REST call 312 (e.g., comparing the conditional elements of the active service conditions to the REST call parameters). For each matching service configuration 316, the customization engine 310 executes the associated configuration program(s) 318. The configuration program 318 may perform any of the operations described herein, or other types of operations.

In some situations, the inbound REST call 312 is rejected by the configuration program, and thus the customization engine 310 does not generate an outbound REST call 314 to the IIoT machine 320. In other situations, the inbound REST call 312 is not rejected. As such, the customization engine 310 generates the outbound REST call 314. More specifically, in the example shown in FIG. 3, the customization engine 310 forms the outbound REST call 314 with the URL of the IIoT machine 320, an HTTP verb, a URI, and optionally additional parameters in the message body of the outbound REST call 314. By default, the URL is a URL associated with the particular IIoT machine 320 (e.g., the "custom URL" provided by the cloud 106 for the IIoT machine 320 or, more specifically, the service 322, as described above), and the HTTP verb, the URI, and the parameters in the message body of the outbound REST call 314 mirror those same parameters of the inbound REST call 314. In some situations, the configuration program 318 may change any one or more of those parameters (e.g., as altered by any one or more of the configuration programs 318 that are executed for this REST call 312).

Upon receipt of the outbound REST call 314, the API 324 of the service 322 running on the IIoT machine 320 processes the REST call 314 as it normally would (e.g., responding with an HTTP response, optionally including a JSON-formatted response body). The IIoT machine 320 may represent a digital twin of a real-world asset (e.g., a data model of a real-world asset). This response (not separately shown in FIG. 3) is sent back to the customization engine 310, and the customization engine 310 subsequently passes the response back to the requesting device 306.

Figure 4:
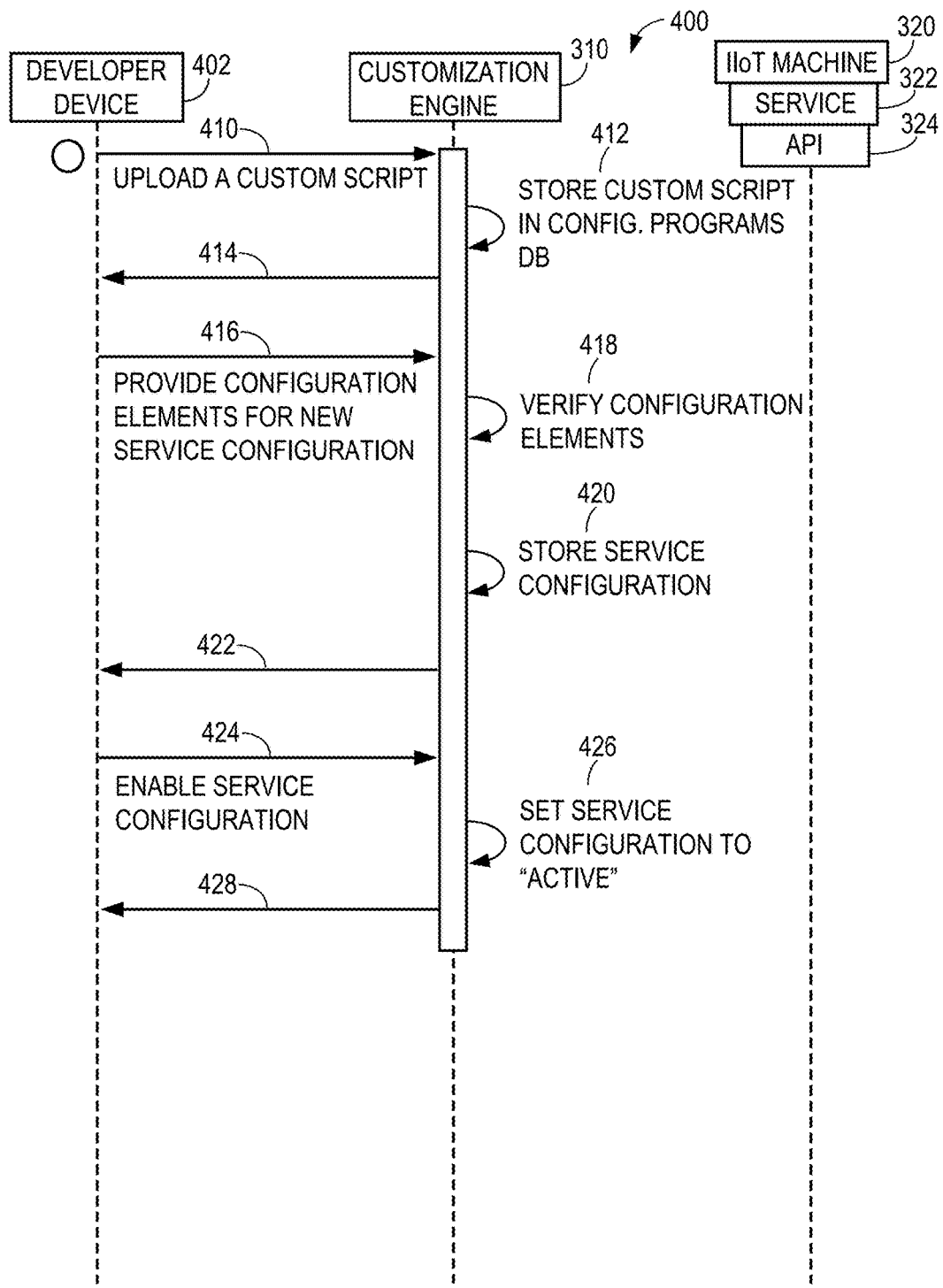
FIG. 4 is an interaction diagram illustrating a method, in accordance with an example embodiment, of configuring cloud-based customization functionality for the IIoT machine in the IIoT system.

FIG. 4 is an interaction diagram illustrating a method 400, in accordance with an example embodiment, of configuring cloud-based customization functionality for the IIoT machine 320 in the IIoT system 100. The method 400 utilizes a developer device 402 and the customization engine 310. In some example embodiments the developer device 402 may be a personal computer of the user 302 (e.g., an asset manager, a software developer), or the requesting device 306. At operation 410, the developer device 402 may upload a custom configuration program 318 (e.g., a script). This script is configured to perform operations related to REST calls 312 when executed by the customization engine 310, as described above. In the example shown in FIGS. 4 and 5, the custom configuration program 318 is configured to send an email to an asset manager, and the email includes parameters of the incoming REST call 312 (e.g., identity of the IIoT machine 320) and alert text including "Deletion made to asset <assetID>". At operation 412, the customization engine 310 receives the custom configuration program 318 and stores the script in the cloud database 308 (e.g., as a file in a filesystem). At operation 414, the customization engine 310 returns a confirmation to the developer device 402, and may return an identifier associated with the custom configuration program 318 (e.g., a file named '/confprg/custom1').

At operation 416, the developer device 402 provides configuration elements for a new service configuration (e.g., the service configuration 316). In this example, the developer provides an asset identifier (ID) for the IIoT machine 320, a conditional element indicating a method of 'DELETE', and the identifier of the custom configuration program 318 '/confprg/custom1.js'. As such, the developer has configured the service configuration 316 to execute the /confprg/custom1.js script whenever the customization engine 310 receives a REST call (e.g., REST call 312) that identifies the IIoT machine 320 (e.g., through the asset ID, used as another conditional element) and a "DELETE" operation.

At operation 418, the customization engine 310 performs a verification of the configuration elements. This verification may include verifying the asset ID (e.g., existence of the asset ID in an asset ID database), verifying existence of the identified configuration program 318 (e.g., existence of the /confprg/custom1.js script), validating that the service configuration 316 contains proper fields, validating the values of the fields, validating that the configuration program 318 is applicable to the REST methods specified by the service configuration 316, validating that the service configuration 316 provides the proper parameters, check the domain object against a schema (e.g., JSON schema), enforcing of a state machine, verify role-based privileges (e.g., whether the user 302 has the right to perform the requested REST call 312), checking conformance of the structure of assets against an ideal (e.g., checking that an engine has all its parts, and that they are all of the correct part number for their position), and so forth. If verification fails, the customization engine 310 may reject the new service configuration. In the example shown, verification succeeds at operation 418, and at operation 420, the customization engine 310 stores the service configuration (e.g., in the cloud database 308) and returns an indication of success to the developer device 402 at operation 422.

At operation 424, the developer device 402 transmits an enablement request to the customization engine 310, indicating that the new service configuration is to be enabled. Enabling of the new service configuration causes the customization engine 310 to begin checking the incoming REST calls against that new service configuration (e.g., along with any other service configurations that may already be active). At operation 426, the customization engine 310 sets the new service configuration to "active" and returns an indication of success to the developer device at operation 428. After these steps of the example method 400, the new service configuration (e.g., the service configuration 314) is not actively being used by the customization engine 310 to examine incoming REST calls 312.

Figure 5:
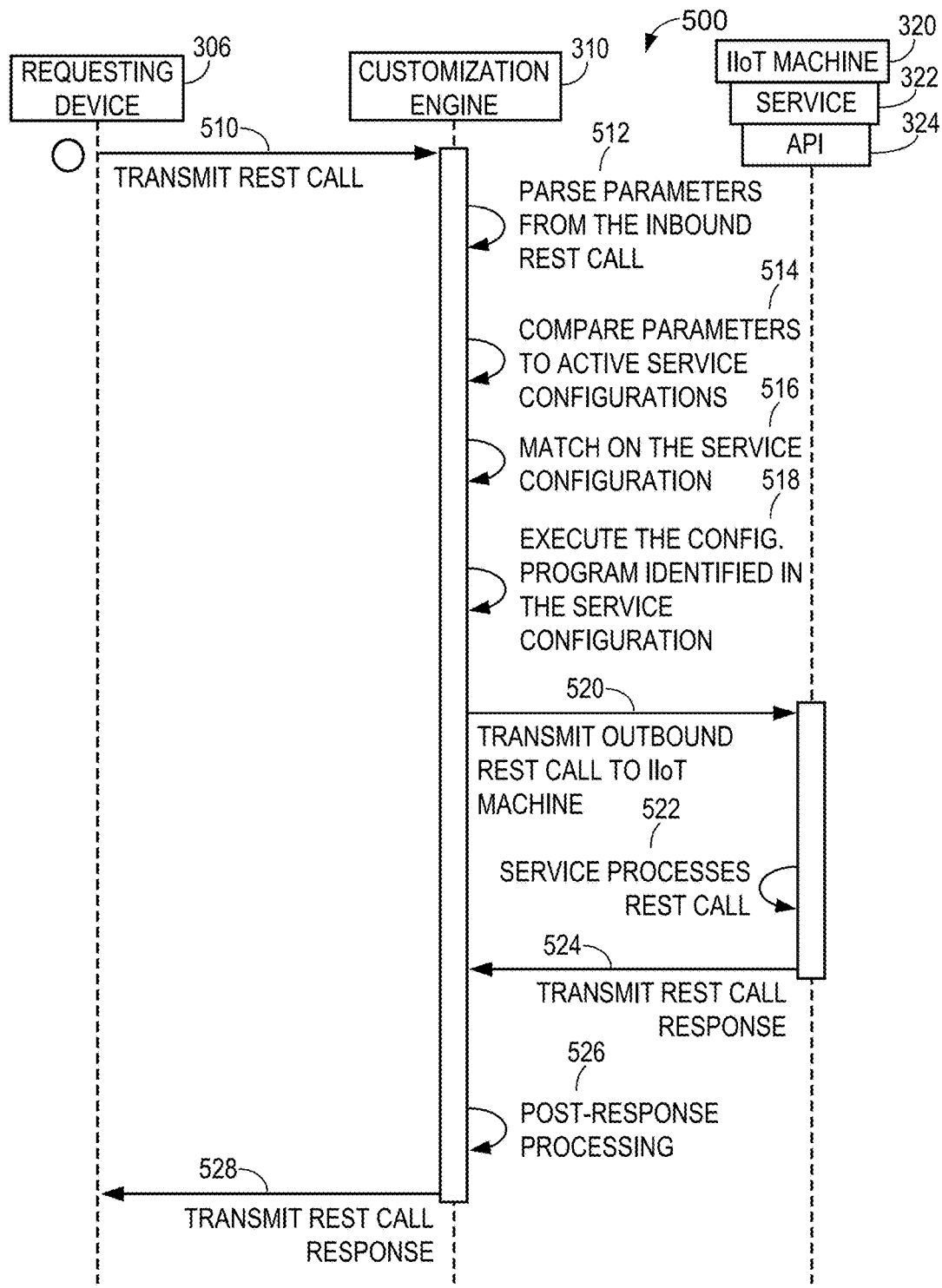
FIG. 5 is an interaction diagram illustrating a method, in accordance with an example embodiment, in which the customization engine provides cloud-based customization functionality for the IIoT machine in the IIoT system.

FIG. 5 is an interaction diagram illustrating a method 500, in accordance with an example embodiment, in which the customization engine 310 provides cloud-based customization functionality for the IIoT machine 320 in the IIoT system 100. The method 500 utilizes the requesting device 306, the customization engine 310, and the IIoT machine 320. In some embodiments, the service 322 or the API 324 exposed by the service may perform any of the operations of the IIoT machine 320. At operation 510, the requesting device 306 transmits a REST call (e.g., the inbound REST call 312) to the customization engine 310. At operation 512, the customization engine 310 receives the REST call 312 and parses the REST call 312 into individual parameters (e.g., parameter name, parameter value pairs). For example, the REST call 312 may include the URL, the HTTP verb, and various name/value pairs in the body of the REST call 312. In other words, the parameters of the REST call 312 are distilled from the REST call 312 into individual name/value pairs. In this example, the REST call includes a machine name for the IIoT machine 320, a "PUT" HTTP verb, a URI identifying a service on the IIoT machine 320, and a method of "DELETE".

At operation 514, the customization engine 310 compares the parameters to a set of active service configurations (e.g., including the new service configuration activated as described above with respect to FIG. 4). At operation 516, the parameters of this example REST call match the conditional elements of the new service configuration because this REST call is bound for the IIoT machine 320 and because the REST call indicates a method of "DELETE". As such, at operation 518, the customization engine 310 executes the configuration program identified by the new service configuration (e.g., the script "/confprg/custom1.js"). In this example, this custom configuration program causes an email to be generated and sent (e.g., with the data components mentioned above, as provided by the parameters parsed from the REST call).

In some embodiments, execution of the configuration program 318 causes changes to one or more of the parameters from the inbound REST call 312. In some embodiments, execution of the configuration program 318 may add or remove one or more parameters of the inbound REST call 312 (e.g., before they become parameters of the outbound REST call 314). For example, the asset manager may wish all REST calls to the particular IIoT machine 320 to include a timestamp. As such, the service configuration 316 may include a conditional element checking for the absence of a timestamp parameter, and the configuration program 318 may add a timestamp parameter to the outbound REST call 314 upon execution.

Since the custom configuration program did not reject this REST call (e.g., sent an email, but is not rejecting the REST call), the customization engine 310 constructs and transmits an outbound REST call (e.g., the outbound REST call 314) to the IIoT machine 320 at operation 520. The destination for the outbound REST call 314 is a configuration setting of the customization engine 310 based on the URL from the inbound REST call 312 (e.g., the mapping between the custom URL of the IIoT machine 320 (or the service 322) and the actual address of the IIoT machine 320). At operation 522, the IIoT machine 320 (e.g., the API 324 of the service 322) receives this REST call and processes the REST call as it normally would. At operation 524, the IIoT machine 320 constructs and transmits a response message to the customization engine 310 (referred to herein as the inbound REST response message, from the perspective of the customization engine 310).

In some embodiments, the customization engine 310 performs post-response processing on the response message at operation 526. For example, similar to the incoming REST calls 312, the developer may configure service configurations to be activated only on response messages, and may execute operations when receiving those response messages (e.g., send an alert email if the response message indicates a failure of a REST call).

At operation 528, the customization engine 310 constructs and transmits a response back to the requesting device 306 (referred to herein as an outbound REST response message, from the perspective of the customization engine 310). By default, the response includes the response data provided by the service 322 of the IIoT machine 320. In situations with post-response processing, the response data may be altered by execution of any matching service configurations.

Figure 6:
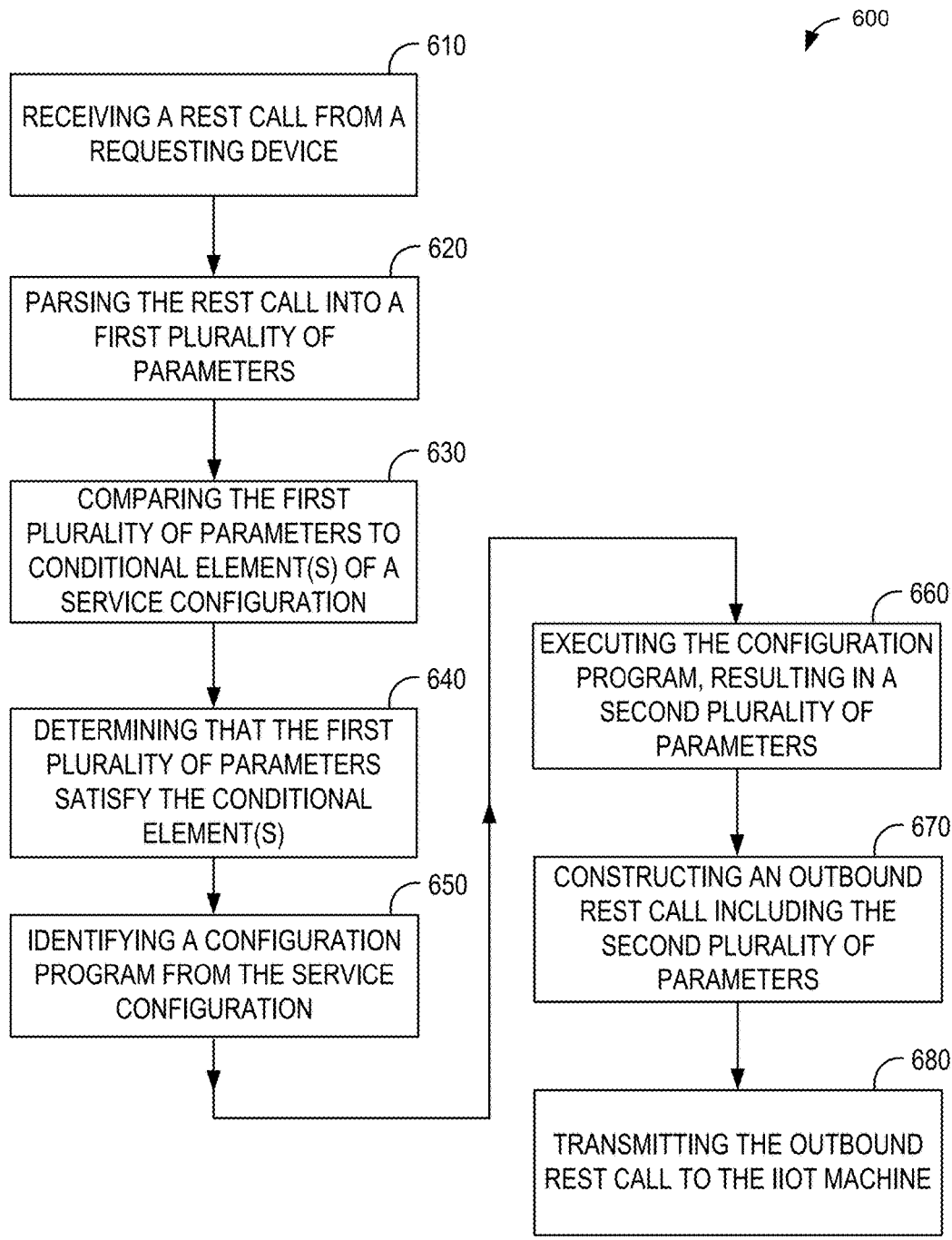
FIG. 6 illustrates a computer-implemented method, in accordance with an example embodiment, for providing customization of services in an IIoT system.

FIG. 6 illustrates a computer-implemented method 600, in accordance with an example embodiment, for providing customization of services in an IIoT system 100. The computer-implemented method 600 is performed by a computing device (e.g., the customization engine 310) comprising at least one processor and a memory. In the example embodiment, the method 600 includes receiving a REST call from a requesting device (operation 610). The REST call identifies an IIoT machine. The IIoT machine executes a service exposing a REST-ful API. The method also includes parsing the REST call into a plurality of parameters (operation 620).

The method 600 includes comparing the plurality of parameters to at least one conditional element of a first service configuration of a plurality of service configurations (operation 630). The method 600 also includes determining that the plurality of parameters satisfies the at least one conditional element of the first service configuration based on the comparing (operation 640). The method 600 further includes identifying a first configuration program of a plurality of configuration programs from the first service configuration (operation 650).

The method 600 also includes executing the first configuration program, with the executing resulting in a second plurality of parameters based on the identifying (operation 660). In some embodiments, executing the first configuration program causes the adding of a new parameter to the second plurality of parameters, the new parameter is not included in the first plurality of parameters. In some embodiments, executing the first configuration program causes a first parameter of the first plurality of parameters to be excluded from the second plurality of parameters. In some embodiments, executing the first configuration program causes the changing of a first parameter of the first plurality of parameters into an altered parameter, if the altered parameter is included in the second plurality of parameters.

The method 600 further includes constructing an outbound REST call including the second plurality of parameters (operation 670). The method 600 also includes transmitting the outbound REST call to the IIoT machine for processing by the service (operation 680).

In some embodiments, the method 600 also includes receiving an inbound REST response message from the IIoT machine, the inbound REST response message is responsive to the outbound REST call, executing a second configuration program based on the inbound REST response message, and transmitting an outbound REST response message to requesting device. In some embodiments, the method 600 also includes receiving a second REST call, determining that the second REST call satisfies one or more conditional elements of a second service configuration, and executing a second configuration program causing rejection of the second REST call. In some embodiments, the method 600 also includes identifying a uniform resource locator (URL) from the first REST call and determining an address associated with the IIoT machine based on the URL from the first REST call, wherein constructing the outbound REST call further includes constructing the outbound REST to call to include the address.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-6 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the IoT, while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 7:
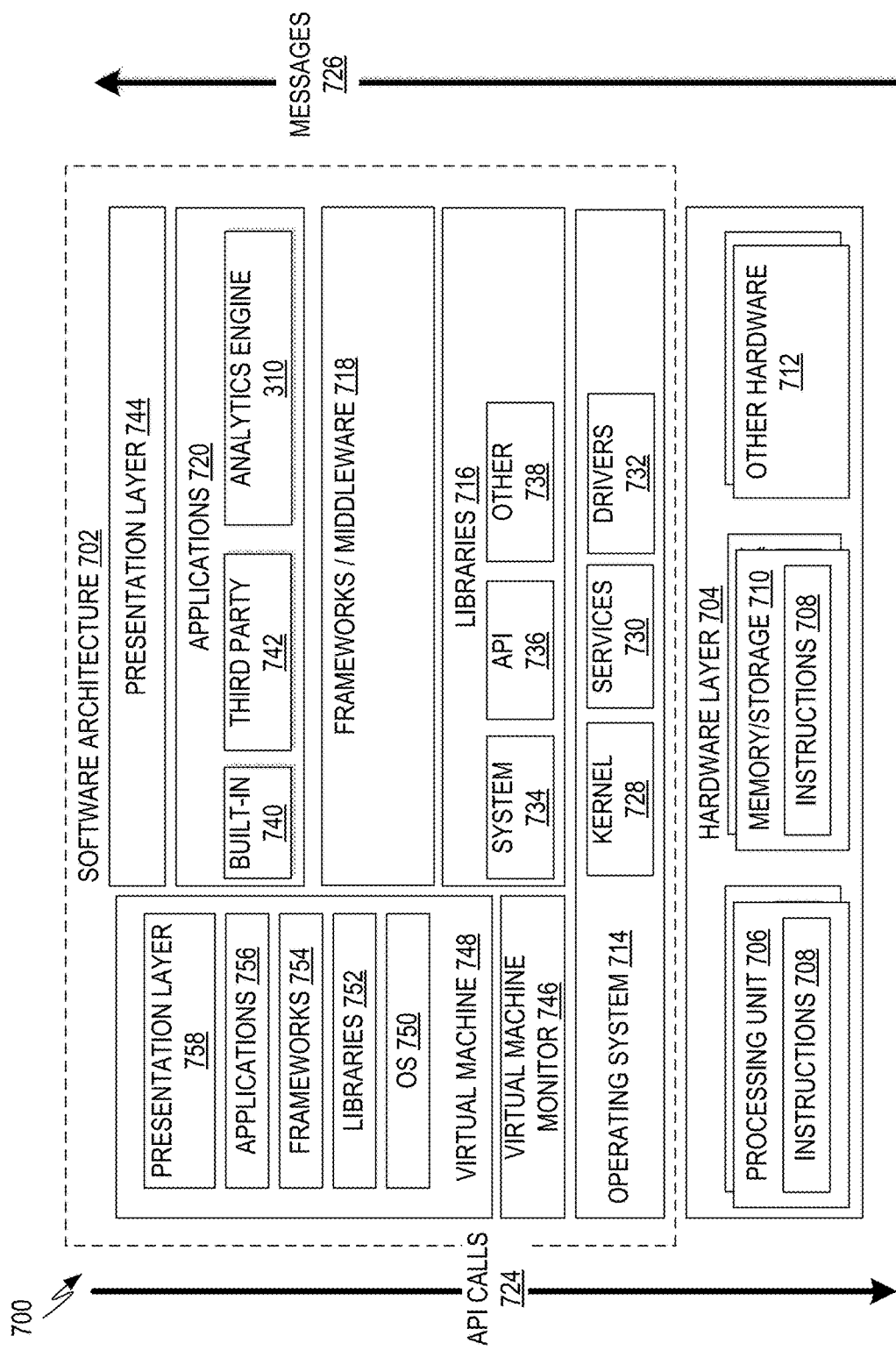
FIG. 7 is a block diagram illustrating a representative software architecture which may be used in conjunction with various hardware architectures herein described.

FIG. 7 is a block diagram 700 illustrating a representative software architecture 702, which may be used in conjunction with various hardware architectures herein described, for customization of services in an IIoT. FIG. 7 is merely a non-limiting example of a software architecture 702, and it will be appreciated that many other architectures may be implemented to facilitate the functionality described herein. The software architecture 702 may be executing on hardware such as a machine 800 of FIG. 8 that includes, among other things, processors 810, memory/storage 830, and input/output (I/O) components 850. A representative hardware layer 704 is illustrated and can represent, for example, the machine 800 of FIG. 8. The representative hardware layer 704 comprises one or more processing units 706 having associated executable instructions 708. The executable instructions 708 represent the executable instructions of the software architecture 702, including implementation of the methods, modules, and so forth of FIGS. 1-6. The hardware layer 704 also includes memory and/or storage modules 710, which also have the executable instructions 708. The hardware layer 704 may also comprise other hardware 712, which represents any other hardware of the hardware layer 704, such as the other hardware illustrated as part of the machine 800.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720, and a presentation layer 744. Operationally, the applications 720 and/or other components within the layers may invoke API calls 724 through the software stack and receive a response, returned values, and so forth illustrated as messages 726 in response to the API calls 724. The layers illustrated are representative in nature, and not all software architectures have all layers. For example, some mobile or special purpose operating systems may not provide a frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730, and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as Moving Picture Experts Group-4 (MPEG-4), H.264, MP3, Advanced Audio Coding (AAC), Adaptive Multi-Rate (AMR), Joint Photographic Experts Group (JPEG), Portable Network Graphics (PNG), graphics libraries (e.g., an OpenGL framework that may be used to render 2-dimensional (2D) and 3-dimensional (3D) in a graphic context on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks/middleware 718 may provide a higher-level common infrastructure that may be utilized by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740, third-party applications 742, and the analytics engine 310. Examples of representative built-in applications 740 may include, but are not limited to, a contacts application, a browser application, a book reader application, a location application, a media application, a messaging application, and/or a game application. Third-party applications 742 may include any of the built-in applications 740 as well as a broad assortment of other applications. In a specific example, the third-party application 742 (e.g., an application developed using the Android™ or iOS™ SDK by an entity other than the vendor of the particular platform) may be mobile software running on a mobile operating system such as iOS™, Android™, Windows® Phone, or other mobile operating systems. In this example, the third-party application 742 may invoke the API calls 724 provided by the mobile operating system such as the operating system 714 to facilitate functionality described herein.

The applications 720 may utilize built-in operating system functions (e.g., kernel 728, services 730, and/or drivers 732), libraries (e.g., system libraries 734, API libraries 736, and other libraries 738), and frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures utilize virtual machines. In the example of FIG. 7, this is illustrated by a virtual machine 748. A virtual machine creates a software environment where applications/modules can execute as if they were executing on a hardware machine (such as the machine 800 of FIG. 8, for example). The virtual machine 748 is hosted by a host operating system (operating system 714 in FIG. 7) and typically, although not always, has a virtual machine monitor 746, which manages the operation of the virtual machine 748 as well as the interface with the host operating system (i.e., operating system 714). A software architecture executes within the virtual machine 748, such as an operating system 750, libraries 752, frameworks/middleware 754, applications 756, and/or a presentation layer 758. These layers of software architecture executing within the virtual machine 748 can be the same as corresponding layers previously described or may be different.

Example Machine Architecture and Machine-Readable Medium

Figure 8:
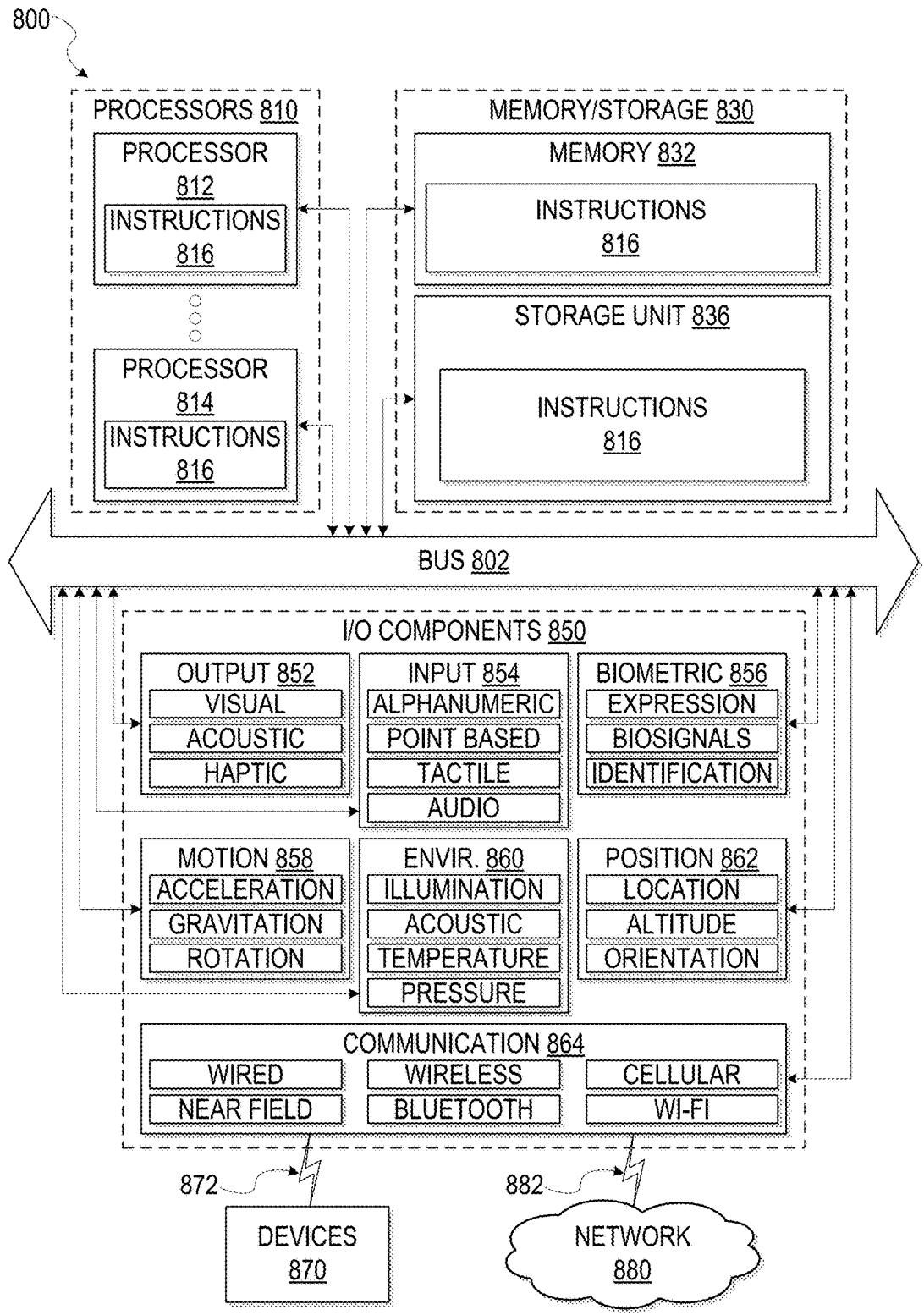
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions 816 from a machine-readable medium (e.g., a machine-readable storage medium) and perform any one or more of the methodologies discussed herein. Specifically, FIG. 8 shows a diagrammatic representation of the machine 800 in the example form of a computer system, within which the instructions 816 (e.g., software, a program, an application, an applet, an app, or other executable code) for causing the machine 800 to perform any one or more of the methodologies discussed herein may be executed. For example, the instructions 816 may cause the machine 800 to execute the flow diagram of FIGS. 4-5. Additionally, or alternatively, the instructions 816 may implement modules of FIG. 1, and so forth. The instructions 816 transform the general, non-programmed machine 800 into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory/storage 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 812 and a processor 814 that may execute the instructions 816. The term "processor" is intended to include a multi-core processor 812, 814 that may comprise two or more independent processors 812, 814 (sometimes referred to as "cores") that may execute the instructions 816 contemporaneously. Although FIG. 8 shows multiple processors 810, the machine 800 may include a single processor 812, 814 with a single core, a single processor 812, 814 with multiple cores (e.g., a multi-core processor 812, 814), multiple processors 812, 814 with a single core, multiple processors 812, 814 with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the cache memory of processor 812, 814), or any suitable combination thereof, during execution thereof by the machine 800. Accordingly, the memory 832, the storage unit 836, and the memory of the processors 810 are examples of machine-readable media.

As used herein, "machine-readable medium" means a device able to store the instructions 816 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions 816, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine 800 will depend on the type of machine 800. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., HTTP). Similarly, the instructions 816 may be transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A system comprising:
   at least one hardware processor;
   a memory storing a plurality of service configurations and a plurality of configuration programs, the plurality of configuration programs including a first configuration program, the plurality of service configurations including a first service configuration identifying at least one conditional element and the first configuration program; and
   a customization engine, executed by the at least one hardware processor, configured to perform operations comprising:
      receiving an incoming representational state transfer (REST) call from a requesting device, the REST call being an operational call identifying an Industrial Internet of Things (IIoT) machine using a custom identifier, the IIoT machine executing a service exposing a REST-ful application programming interface (API);
      parsing the REST call into a plurality of parameters;
      comparing the plurality of parameters to the at least one conditional element of the first service configuration;
      based on the comparing, determining that the plurality of parameters satisfies the at least one conditional element of the first service configuration, wherein the at least one conditional element is satisfied by detecting a particular REST verb or a particular data management operation;
      identifying the first configuration program from the first service configuration;
      based on the identifying, executing the first configuration program, the executing resulting in a second plurality of parameters;
      constructing an outbound REST call to include the second plurality of parameters; and
      transmitting the outbound REST call to the IIoT machine for processing by the service, the outbound REST call being a customized communication between the engine and the API that adds new functionality to the incoming REST call.

2. The system of claim 1, wherein the customization engine is further configured to perform operations comprising:
   receiving an inbound REST response message from the IIoT machine, the inbound REST response message being responsive to the outbound REST call;
   executing a second configuration program based on the inbound REST response message; and
   transmitting an outbound REST response message to requesting device.

3. The system of claim 1, wherein executing the first configuration program causes the adding of a new parameter to the second plurality of parameters, the new parameter being not included in the first plurality of parameters.

4. The system of claim 1, wherein executing the first configuration program causes a first parameter of the first plurality of parameters to be excluded from the second plurality of parameters.

5. The system of claim 1, wherein executing the first configuration program causes the changing of a first parameter of the first plurality of parameters into an altered parameter, the altered parameter being included in the second plurality of parameters.

6. The system of claim 1, wherein the customization engine is further configured to perform operations comprising:
   receiving a second REST call;
   determining that the second REST call satisfies one or more conditional elements of a second service configuration; and
   executing a second configuration program causing rejection of the second REST call.

7. The system of claim 1, wherein the customization engine is further configured to perform operations comprising:
   identifying a uniform resource locator (URL) from the first REST call; and
   determining an address associated with the IIoT machine based on the URL from the first REST call,
   wherein constructing the outbound REST call further includes constructing the outbound REST to call to include the address.

8. A computer-implemented method comprising:
   receiving an incoming representational state transfer (REST) call from a requesting device, the REST call, the REST call being an operational call identifying an Industrial Internet of Things (IIoT) machine using a custom identifier, the IIoT machine executing a service exposing a REST-ful application programming interface (API);
   parsing the REST call into a plurality of parameters;
   comparing the plurality of parameters to at least one conditional element of a first service configuration of a plurality of service configurations;
   based on the comparing, determining that the plurality of parameters satisfies the at least one conditional element of the first service configuration, wherein the at least one conditional element is satisfied by detecting a particular REST verb or a particular data management operation;
   identifying a first configuration program of a plurality of configuration programs from the first service configuration;
   based on the identifying, executing the first configuration program, the executing resulting in a second plurality of parameters;
   constructing an outbound REST call to include the second plurality of parameters; and
   transmitting the outbound REST call to the IIoT machine for processing by the service, the outbound REST call being a customized communication between the engine and the API that adds new functionality to the incoming REST call.

9. The method of claim 8, further comprising:
   receiving an inbound REST response message from the IIoT machine, the inbound REST response message being responsive to the outbound REST call;
   executing a second configuration program based on the inbound REST response message; and
   transmitting an outbound REST response message to requesting device.

10. The method of claim 8, wherein executing the first configuration program causes the adding of a new parameter to the second plurality of parameters, the new parameter being not included in the first plurality of parameters.

11. The method of claim 8, wherein executing the first configuration program causes a first parameter of the first plurality of parameters to be excluded from the second plurality of parameters.

12. The method of claim 8, wherein executing the first configuration program causes the changing of a first parameter of the first plurality of parameters into an altered parameter, the altered parameter being included in the second plurality of parameters.

13. The method of claim 8, further comprising:
   receiving a second REST call;
   determining that the second REST call satisfies one or more conditional elements of a second service configuration; and
   executing a second configuration program causing rejection of the second REST call.

14. The method of claim 8, further comprising:
   identifying a uniform resource locator (URL) from the first REST call; and
   determining an address associated with the IIoT machine based on the URL from the first REST call,
   wherein constructing the outbound REST call further includes constructing the outbound REST to call to include the address.

15. A non-transitory machine-readable medium storing processor-executable instructions which, when executed by a processor, cause the processor to perform operations comprising:
   receiving an incoming representational state transfer (REST) call from a requesting device, the REST call, the REST call being an operational call identifying an Industrial Internet of Things (IIoT) machine using a custom identifier, the IIoT machine executing a service exposing a REST-ful application programming interface (API);
   parsing the REST call into a plurality of parameters;
   comparing the plurality of parameters to at least one conditional element of a first service configuration of a plurality of service configurations;
   based on the comparing, determining that the plurality of parameters satisfies the at least one conditional element of the first service configuration, wherein the at least one conditional element is satisfied by detecting a particular REST verb or a particular data management operation;
   identifying a first configuration program of a plurality of configuration programs from the first service configuration;
   based on the identifying, executing the first configuration program, the executing resulting in a second plurality of parameters;
   constructing an outbound REST call to include the second plurality of parameters; and
   transmitting the outbound REST call to the IIoT machine for processing by the service, the outbound REST call being a customized communication between the engine and the API that adds new functionality to the incoming REST call.

16. The non-transitory machine-readable medium of claim 15, wherein the processor-executable instructions further cause the processor to perform operations comprising:
   receiving an inbound REST response message from the IIoT machine, the inbound REST response message being responsive to the outbound REST call;
   executing a second configuration program based on the inbound REST response message; and
   transmitting an outbound REST response message to requesting device.

17. The non-transitory machine-readable medium of claim 15, wherein executing the first configuration program causes the adding of a new parameter to the second plurality of parameters, the new parameter being not included in the first plurality of parameters.

18. The non-transitory machine-readable medium of claim 15, wherein executing the first configuration program causes a first parameter of the first plurality of parameters to be excluded from the second plurality of parameters.

19. The non-transitory machine-readable medium of claim 15, wherein executing the first configuration program causes the changing of a first parameter of the first plurality of parameters into an altered parameter, the altered parameter being included in the second plurality of parameters.

20. The non-transitory machine-readable medium of claim 15, wherein the processor-executable instructions further cause the processor to perform operations comprising:
- receiving a second REST call;
- determining that the second REST call satisfies one or more conditional elements of a second service configuration; and
- executing a second configuration program causing rejection of the second REST call.

\* \* \* \* \*